United States Patent
Ishikawa et al.

(10) Patent No.: US 10,604,068 B2
(45) Date of Patent: Mar. 31, 2020

(54) VEHICLE INTERIOR LIGHT CONTROL SYSTEM, VEHICLE INTERIOR LIGHT DRIVING DEVICE, VEHICLE INTERIOR LIGHT CONTROL METHOD AND RECORDING MEDIUM

(71) Applicants: TOYOTA JIDOSHA KABUSHIKI KAISHA, Toyota-shi, Aichi-ken (JP); SUMITOMO WIRING SYSTEMS, LTD., Yokkaichi-shi, Mie (JP)

(72) Inventors: Yasuhiro Ishikawa, Toyota (JP); Yuzo Yamanishi, Yokkaichi (JP); Isamu Kumano, Yokkaichi (JP); Genta Yamane, Yokkaichi (JP)

(73) Assignees: TOYOTA JIDOSHA KABUSHIKI KAISHA, Toyota (JP); SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 15/984,478

(22) Filed: May 21, 2018

(65) Prior Publication Data

US 2018/0354416 A1 Dec. 13, 2018

(30) Foreign Application Priority Data

Jun. 9, 2017 (JP) ................................. 2017-114599

(51) Int. Cl.
*B60Q 3/82* (2017.01)
*B60Q 3/74* (2017.01)
*B60Q 3/80* (2017.01)

(52) U.S. Cl.
CPC ................. *B60Q 3/82* (2017.02); *B60Q 3/74* (2017.02); *B60Q 3/80* (2017.02)

(58) Field of Classification Search
CPC ............. B60Q 3/82; B60Q 3/74; H05B 37/02
See application file for complete search history.

(56) References Cited

U.S. PATENT DOCUMENTS

2016/0250967 A1* 9/2016 Lee .......................... B60Q 3/80
315/79
2016/0318438 A1 11/2016 Wadell
(Continued)

FOREIGN PATENT DOCUMENTS

CN 101336024 A 12/2008
CN 102869166 A 1/2013
(Continued)

OTHER PUBLICATIONS

Christian Miner, EIC 2800 Search Report, dated Oct. 24, 2019, Scientific and Technical Information Center (Year: 2019).*
(Continued)

*Primary Examiner* — Raymond R Chai
(74) *Attorney, Agent, or Firm* — Oliff PLC (57) ABSTRACT

A vehicle interior light control system that controls the state concerning a vehicle interior light mounted to a vehicle includes a lighting state control part that gradually changes the vehicle interior light from a first state to a second state different from the first state, and a time adjustment part that adjusts time required for a state change from the first state to the second state made by the lighting state control part. The vehicle interior light control system further includes a pattern storage unit in which a pattern of change in the vehicle interior light from the first state to the second state is stored. The lighting state control part changes the state of the vehicle interior light in accordance with the pattern stored in the pattern storage unit.

7 Claims, 9 Drawing Sheets

(56) References Cited

U.S. PATENT DOCUMENTS

2017/0057402 A1    3/2017  Uesugi et al.
2017/0197545 A1*   7/2017  Zhao ........................ B60Q 3/76
2018/0170254 A1*   6/2018  Mioc ........................ B60Q 3/12
2018/0326900 A1*  11/2018  Chen ........................ B60Q 3/74

FOREIGN PATENT DOCUMENTS

| CN | 106476679 A   |   | 3/2017  |   |           |
|----|---------------|---|---------|---|-----------|
| JP | 2014-189101 A |   | 10/2014 |   |           |
| JP | 2015-223882 A |   | 12/2015 |   |           |
| JP | 2015223882 A  | * | 12/2015 |   |           |
| JP | 2016-182839 A |   | 10/2016 |   |           |
| JP | 2016-210410 A |   | 12/2016 |   |           |
| WO | WO-2017186338 A1 | * | 11/2017 | ............... | B60Q 3/85 |

OTHER PUBLICATIONS

Jul. 10, 2019 Office Action issued in Chinese Application No. 201810575595.1.
Jul. 16, 2019 Office Action issued in Japanese Application No. 2017-114599.

* cited by examiner

VEHICLE INTERIOR LIGHT CONTROL COMMAND

| VEHICLE INTERIOR LIGHT NUMBER | LED NUMBER | REACHED LUMINANCE | PATTERN DESIGNATION | TIME VARIABLE INFORMATION |
|---|---|---|---|---|
| | | | | |

STORED PATTERN

ADJUSTMENT PATTERN

TIME ADJUSTMENT

| TIME [s] | DUTY [%] |
|---|---|
| 0 | 0 |
| 0.01 | 0.3 |
| 0.02 | 0.6 |
| 0.03 | 0.8 |
| ... | ... |
| 1.50 | 100 |

| TIME [s] | DUTY [%] |
|---|---|
| 0 × 0.2 | 0 |
| 0.01 × 0.2 | 0.3 |
| 0.02 × 0.2 | 0.6 |
| 0.03 × 0.2 | 0.8 |
| ... | ... |
| 1.50 × 0.2 | 100 |

FIG. 9

VEHICLE INTERIOR LIGHT CONTROL SYSTEM, VEHICLE INTERIOR LIGHT DRIVING DEVICE, VEHICLE INTERIOR LIGHT CONTROL METHOD AND RECORDING MEDIUM

CROSS-REFERENCE TO RELATED APPLICATIONS

This application is based upon and claims the benefit of priority of the prior Japanese Patent Application No. 2017-114599, filed on Jun. 9, 2017, the entire contents of which are incorporated herein by reference.

FIELD

The present disclosure relates to a vehicle interior light control system that controls the lighting state of a vehicle interior light such as a room lamp installed in a vehicle, a vehicle interior light driving device, a vehicle interior light control method and a recording medium.

BACKGROUND

Various vehicle interior lights for visually assisting a driver or passenger, such as, for example, a room lamp, a courtesy lamp, a reading light and a backlight of an instrument panel, are installed inside a vehicle. These vehicle interior lights are so controlled as to be turned on and off in accordance with a switch operation by the user or opening/closing of a vehicle door, for example. Turning on and off of these vehicle interior lights are often controlled by, for example, a body electronic control unit (ECU).

Japanese Patent Application Laid-Open Publication No. 2016-182839 proposes a vehicle interior light control system that aims to prevent decrease in convenience and to reduce unnecessary lighting of a vehicle interior light. In the vehicle interior light control system, an in-vehicle machine that controls turning off of a vehicle interior light which is on performs control to turn off the vehicle interior light if it identifies that a mobile device capable of locking a vehicle door is positioned within a predetermined range outside the vehicle and detects that the vehicle door is locked.

SUMMARY

In recent years, lighting control for so-called fade-in and fade-out which gradually turns on and off a vehicle interior light may be performed for the purpose of producing spatial effects inside a vehicle, for example, not merely for turning on and off the vehicle interior light.

In order to perform lighting control for fade-in and fade-out, a device, a program or the like becomes more complicated compared to the case of merely turning on or off the light. Moreover, the requirement for the time (speed) of fade-in or fade-out varies depending on a vehicle type, for example, causing a problem of lowered versatility of a device that controls the vehicle interior light.

The present disclosure has been made in view of the above circumstances, and aims to provide a highly versatile vehicle interior light control system, a vehicle interior light driving device, a vehicle interior light control method and a recording medium.

A vehicle interior light control system according to an aspect of the present disclosure that controls a state concerning lighting of a vehicle interior light mounted to a vehicle comprises a lighting state control part that gradually changes the vehicle interior light from a first state to a second state different from the first state, and a time adjustment part that adjusts time required for a state change from the first state to the second state made by the lighting state control part.

Moreover, the vehicle interior light control system according to another aspect of the present disclosure, further comprising a pattern storage unit storing a pattern of change in the vehicle interior light from the first state to the second state, wherein the lighting state control part changes a state of the vehicle interior light in accordance with a pattern stored in the pattern storage unit.

Moreover, the vehicle interior light control system according to another aspect of the present disclosure, wherein the time adjustment part generates an adjustment pattern obtained by adjusting time required for a state change for the pattern stored in the pattern storage unit, and the lighting state control part changes a state of the vehicle interior light in accordance with the adjustment pattern generated by the time adjustment part.

Moreover, the vehicle interior light control system according to another aspect of the present disclosure, wherein the pattern storage unit stores a plurality of patterns, the vehicle interior light control system further comprises a pattern selection part that selects any one of the plurality of patterns, and the time adjustment part makes an adjustment for a pattern selected by the pattern selection part.

Moreover, the vehicle interior light control system according to another aspect of the present disclosure, further comprising: a vehicle interior light driving device that includes the lighting state control part, the time adjustment part, the pattern storage unit and the pattern selection part, and that drives the vehicle interior light in accordance with control performed by the lighting state control part; and an in-vehicle control device that is connected to the vehicle interior light driving device via a communication line, and that transmits a command concerning a state change of the vehicle interior light including designation of time required for the state change and designation of the pattern to the vehicle interior light driving device via the communication line.

Moreover, the vehicle interior light control system according to another aspect of the present disclosure, wherein the in-vehicle control device transmits the command including designation of time required for the state change, designation of the pattern and designation of the second state to the vehicle interior light driving device.

Moreover, a vehicle interior light driving device, comprising: a lighting state control part that gradually changes a vehicle interior light mounted to a vehicle from a first state to a second state different from the first state; and a time adjustment part that adjusts time required for a state change from the first state to the second state made by the lighting state control part, wherein the vehicle interior light is driven in accordance with control of the lighting state control part.

Moreover, a vehicle interior light control method of controlling a state concerning lighting of a vehicle interior light mounted to a vehicle, comprising: transmitting, by an in-vehicle control device mounted to the vehicle, a command concerning designation of time required for a state change of the vehicle interior light from a first state to a second state different from the first state to a vehicle interior light driving device that drives the vehicle interior light; and adjusting, by the vehicle interior light driving device, time required for a state change from the first state to the second state while gradually changing the vehicle interior light from the first state to the second state in accordance with a command from the in-vehicle control device.

Moreover, a non-transitory recording medium in which a vehicle interior light control program is recorded, the vehicle interior light control program, causing a vehicle interior light driving device that controls a state concerning lighting of a vehicle interior light mounted to a vehicle to adjust time required for a state change in a case where the vehicle interior light is gradually changed from a first state to a second state different from the first state, and perform processing of changing the vehicle interior light from the first state to the second state in accordance with adjusted time.

According to the present disclosure, the vehicle interior light control system gradually changes the vehicle interior light from the first state to the second state. For example, the vehicle interior light control system performs control such as fade-in where the vehicle interior light is gradually changed from the off state to the on state, fade-out where the light is gradually changed from the on state to the off state, fade-in where the light is changed from the off state to the on state with the brightness of 50%, or fade-out where the light is changed from the on state with the brightness of 50% to the on state with the brightness of 20%. Furthermore, the vehicle interior light control system adjusts the time required for changing the state of the vehicle interior light from the first state to the second state.

Accordingly, time adjustment may be performed by the vehicle interior light control system even in the case where the time required for fade-in or fade-out is different for each vehicle type, for example, and thus the vehicle interior light control system of the same sort may be mounted to multiple types of vehicles, which can enhance the versatility of the vehicle interior light control system.

According to the present disclosure, the vehicle interior light control system stores a pattern of change in the vehicle interior light from the first state to the second state, and changes the state of the vehicle interior light in accordance with the stored pattern. This can implement lighting control suitable for the type of a light source (LED, incandescent light, fluorescent light or the like) that constitutes the vehicle interior light, for example.

With this configuration, an adjustment pattern is generated by adjusting the time required for a state change for the stored pattern, and the state of the vehicle interior light may be changed in accordance with the generated adjustment pattern. This allows for the time adjustment as described above.

Moreover, more than one patterns may be stored. The vehicle interior light control system selects any one of the stored patterns, adjusts time for the selected pattern and changes the state of the vehicle interior light in accordance with the adjustment pattern. Storing more than one patterns allow the vehicle interior light control system to have higher versatility.

A vehicle interior light control system according to the present disclosure further comprises a vehicle interior light driving device that is connected to a vehicle interior light and that drives the vehicle interior light, and an in-vehicle control device that sends a command to the vehicle interior light driving device through communication. In the case of accepting the operation of turning on or off the vehicle interior light by the user, for example, the in-vehicle control device transmits a command concerning turning on or turning off of the vehicle interior light to the vehicle interior light driving device. Here, the in-vehicle control device transmits a command including designation of time required for a state change of the vehicle interior light and designation of a pattern concerning the state change of the vehicle interior light to the vehicle interior light driving device.

For example, compared to the configuration where the in-vehicle control device changes the lighting state of the vehicle interior light connected to the vehicle interior light driving device each time, the configuration where the in-vehicle control device transmits a command for designating the pattern and time to the vehicle interior light driving device as in the vehicle interior light control system according to the present disclosure has such advantages that the communication load between the in-vehicle control device and the vehicle interior light driving device may be reduced, no communication delay depending on a communication situation occurs, the communication details may be simplified, and so forth. Decrease in the degree of freedom related to the control of the lighting state of the vehicle interior light performed by the in-vehicle control device may be compensated by the vehicle interior light driving device adjusting time in accordance with the time designation from the in-vehicle control device.

According to an aspect of the present disclosure, the configuration where the vehicle interior light is gradually changed from the first state to the second state while the time required for the state change of the vehicle interior light from the first state to the second state is adjusted may provide a highly versatile vehicle interior light control system, a vehicle interior light driving device and a vehicle interior light control method.

The above and further objects and features will more fully be apparent from the following detailed description with accompanying drawings.

DETAILED DESCRIPTION

<System Configuration>

Figure 1:
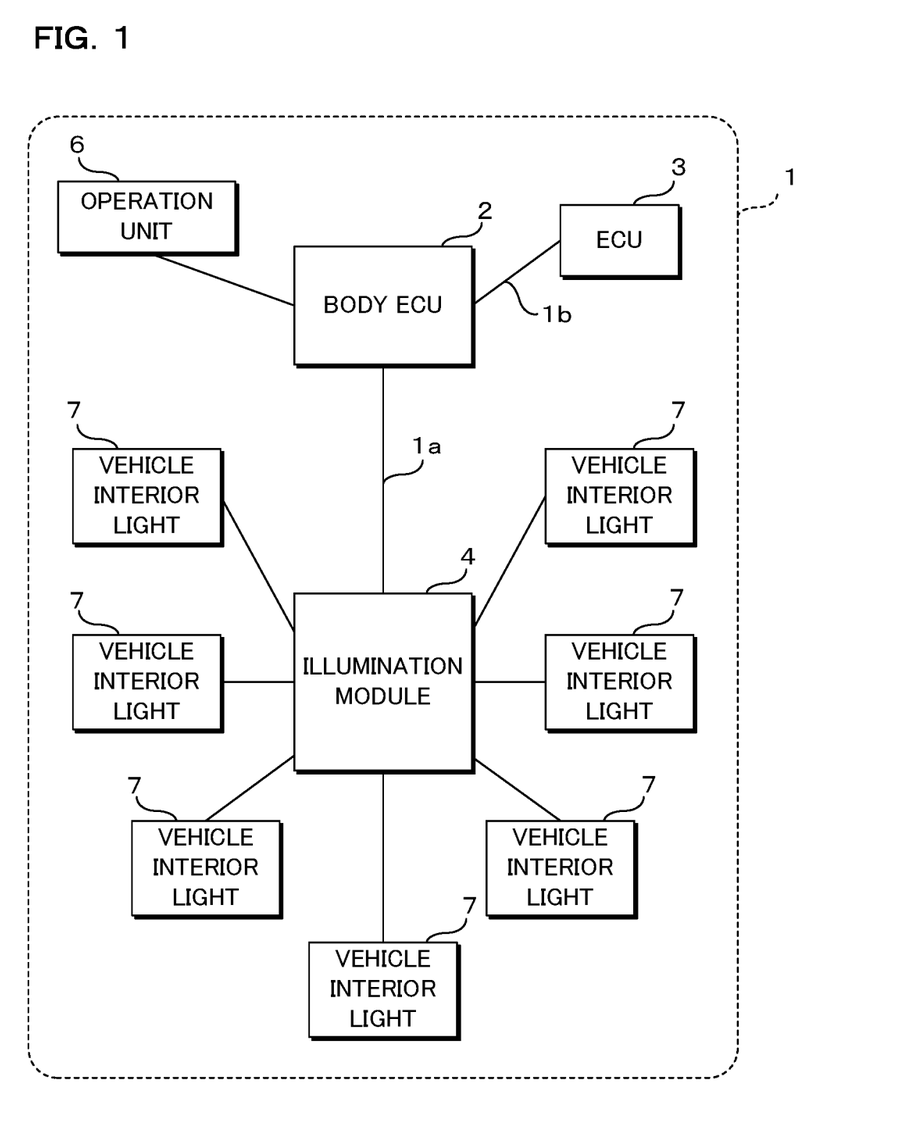
FIG. 1 is a schematic diagram illustrating the configuration of a vehicle interior light control system according to an embodiment.

FIG. 1 is a schematic diagram illustrating the configuration of a vehicle interior light control system according to an embodiment. The vehicle interior light control system according to the present embodiment is configured to perform control related to turning on and off of multiple vehicle interior lights 7 mounted on a vehicle 1 by a body ECU 2 and an illumination module 4 in cooperation with each other. The body ECU 2 and the illumination module 4 are respectively located at appropriate positions in the vehicle 1, and are connected with each other via a communication line 1a. The body ECU 2 and the illumination module 4 may perform communication based on a communication protocol such as Clock Extension Peripheral Interface (CXPI), Controller Area Network (CAN) or Local Interconnect Network (LIN), for example, to send and receive information.

The vehicle 1 is further provided with an operation unit 6 which is operated by the user to turn on and off the vehicle interior lights 7. The operation unit 6 is connected to the body ECU 2 via a signal line or the like, and the body ECU 2 is notified of the operation performed on the operation unit 6. The body ECU 2 is also connected to one or more other ECUs 3 via a communication line 1b which constitutes an in-vehicle network. The body ECU 2 and ECU 3 perform in-vehicle communication based on a communication protocol such as CAN or Ethernet (registered trademark), for example. Regardless of the presence or absence of operation on the operation unit 6, the ECU 3 determines whether the vehicle interior lights 7 are turned on or turned off based on its own processing, and sends a request for turning on or off the lights to the body ECU 2 through in-vehicle communication via the communication line 1b.

The multiple vehicle interior lights 7 include, for example, a room lamp, a courtesy lamp, a reading light, and a back light of an instrument panel in the vehicle 1. Each of the vehicle interior lights 7 has one or more LEDs that serve as a light source. The vehicle interior lights 7 are connected to the illumination module 4 via respective electric lines, signal lines and the like, and are individually driven by the illumination module 4. Furthermore, in the case where any one of the vehicle interior lights 7 has multiple LEDs as a light source, the LEDs may be so configured as to be turned on and off individually.

In the vehicle interior light control system according to the present embodiment, if the body ECU 2 accepts the operation on the operation unit 6 for turning on or off performed by the user, a command to turn on or off the vehicle interior light 7 is transmitted from the body ECU 2 to the illumination module 4. Moreover, in the vehicle interior light control system according to the present embodiment, if the ECU 3 determines that the vehicle interior light 7 is automatically turned on or off and a request for turning on or off is sent from the ECU 3 to the body ECU 2, a command to turn on or off the vehicle interior light 7 is transmitted from the body ECU 2 to the illumination module 4. The ECU 3 may determine if the vehicle interior light 7 is turned on or off based on, for example, the running state of the vehicle 1 or the operating state of the electronic equipment mounted on the vehicle 1, which can achieve control of automatic turning on or off of the vehicle interior lights without any operation by the user.

The illumination module 4 that received the command turns on or off the vehicle interior light 7 of interest. Furthermore, in the vehicle interior light control system according to the present embodiment, it is possible to perform fade-in where the luminance of the vehicle interior light 7 is gradually increased to turn on the light and fade-out where the luminance of the vehicle interior light 7 is gradually decreased to turn off the light. Thus, the command sent from the body ECU 2 to the illumination module 4 includes information such as a pattern of turning on or off, time of fade-in or fade-out, and so forth. The illumination module 4 stores therein basic patterns of turning on and off, and adjusts the time of fade-in or fade-out based on the time designated by a command for the pattern designated by the command from the body ECU 2, to turn on and off the vehicle interior lights 7. For example, the illumination module 4 adjusts the time of change from the turn-off state to the turn-on state in an arbitrary or stepwise manner within the range of the time corresponding to one second ±80% (0.2 to 1.8 seconds) on the basis of the control for fade-in where the vehicle interior light is changed from the off state to the on state in one second.

<Device Configuration>

Figure 2:
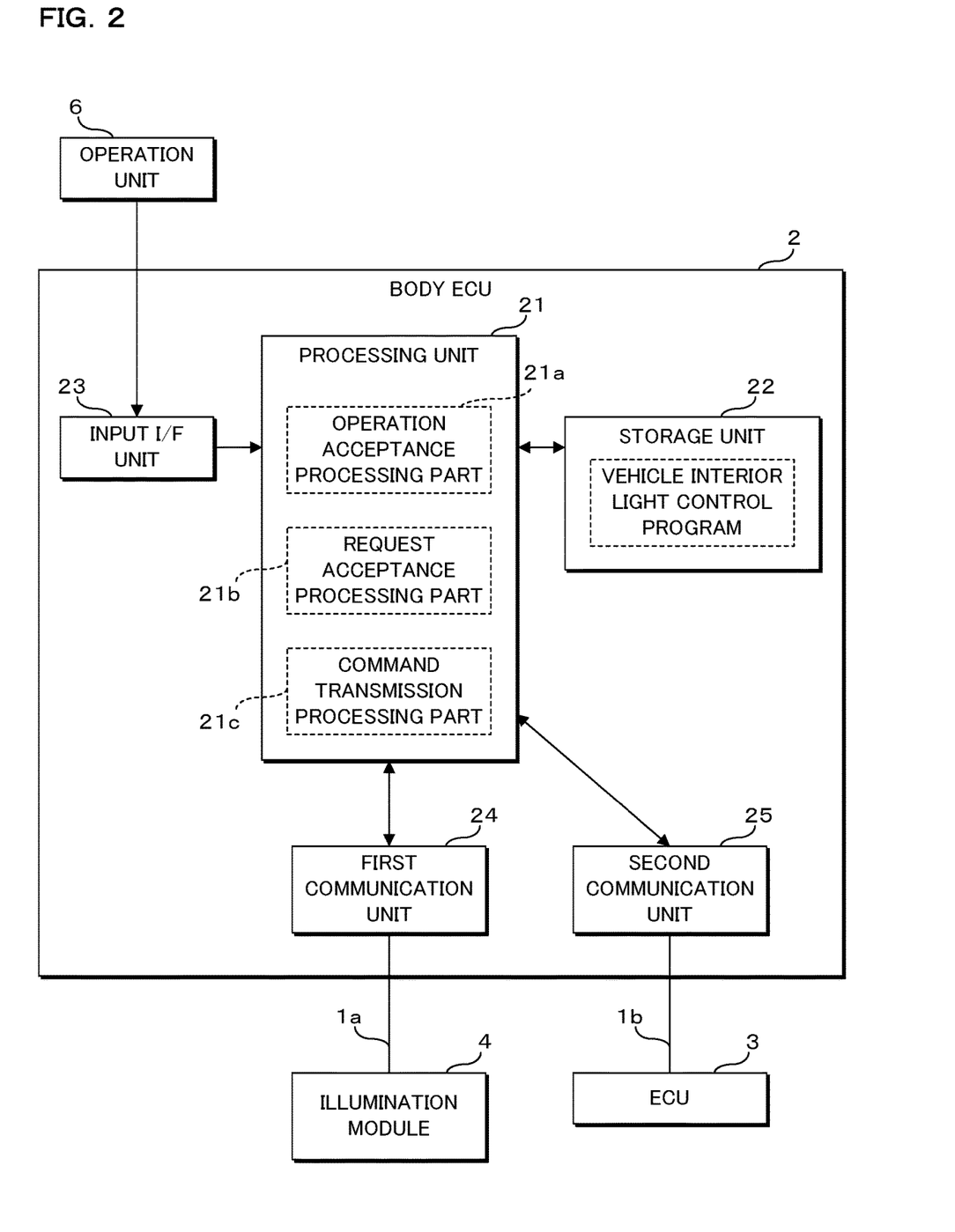
FIG. 2 is a block diagram illustrating the configuration of a body ECU according to the embodiment.

FIG. 2 is a block diagram illustrating the configuration of a body ECU 2 according to the present embodiment. In FIG. 2, however, the blocks of functions concerning control of vehicle interior lights are extracted from the functions held by the body ECU 2, while the blocks concerning functions other than control of vehicle interior lights are not illustrated. The body ECU 2 according to the present embodiment is configured to include a processing unit (processor) 21, a storage unit (storage) 22, an input interface (I/F) unit 23, a first communication unit (transceiver) 24, a second communication unit 25 and so forth. The processing unit 21 is configured with an arithmetic processing device such as a central processing unit (CPU) or micro-processing unit (MPU), which performs various arithmetic operation processing concerning the control of the vehicle interior light of the vehicle 1 by reading out and executing a vehicle interior light control program stored in the storage unit 22. The storage unit 22 is configured with a non-volatile memory element such as a flash memory or an electrically erasable programmable read only memory (EEPROM), for example. The storage unit 22 stores therein a program to be executed by the processing unit 21, such as a vehicle interior light control program, data required to execute the program, and so forth.

The input I/F unit 23 is connected to the operation unit 6 via a signal line or the like. The operation unit 6 may be, for example, a switch located in the vicinity of each vehicle interior light 7 that switches the light between on and off. The operation unit 6 outputs a signal corresponding to the operation performed by the user to the body ECU 2, and the input I/F unit 23 of the body ECU 2 samples and obtains a signal from the operation unit 6 to send the signal to the processing unit 21. It is noted that the operation unit 6 may be configured to output a signal in response to opening and closing operations of a door of the vehicle 1, for example, configured to output a signal in response to operation for an ignition switch of the vehicle 1, for example, or configured to output a signal in response to on/off operation for a power supply of in-vehicle equipment mounted to the vehicle 1, for example, or may have various configurations other than the ones described above. The vehicle 1 may be provided with multiple operation units 6, in which case signals from the respective operation units 6 are input to the input I/F unit 23.

The first communication unit 24 is connected to the illumination module 4 via the communication line 1a, and transmits/receives information to/from the illumination module 4 via the communication line 1a. The first communication unit 24 performs communication based on a communication protocol such as CXPI, CAN or LIN, for example. The first communication unit 24 transmits information by converting information for transmission sent from the processing unit 21 into an electric signal and outputting the signal to the communication line 1a, and sends reception information obtained by sampling the signal on the communication line 1a to the processing unit 21. In the present embodiment, information only needs to be transmitted from the body ECU 2 to the illumination module 4, not necessarily from the illumination module 4 to the body ECU 2.

The second communication unit 25 is connected to one or more ECUs 3 via the communication line 1*b*, and transmits/receives information to/from the ECU(s) 3 via the communication line 1*b*. The second communication unit 25 performs communication based on a communication protocol such as CAN or Ethernet, for example. The second communication unit 25 transmits information by converting information for transmission sent from the processing unit 21 into an electric signal and outputting the signal to the communication line 1*b*, and sends reception information obtained by sampling the signal on the communication line 1*b* to the processing unit 21.

In the processing unit 21 of the body ECU 2 according to the present embodiment, the vehicle interior light control program stored in the storage unit 22 is executed to provide an operation acceptance processing part 21*a*, a request acceptance processing part 21*b* and a command transmission processing part 21*c* as software functional blocks. The operation acceptance processing part 21*a* monitors an input signal from the operation unit 6, to perform processing of accepting the operation of the user performed on the operation unit 6. The request acceptance processing part 21*b* performs processing of accepting a request concerning turning on or turning off of the vehicle interior light 7 from a different ECU 3 via the communication line 1*b*. The command transmission processing part 21*c* performs processing of generating a command for controlling the vehicle interior light that turns on or off the vehicle interior light 7 and sending the command to the first communication unit 24 based on the operation accepted by the operation acceptance processing part 21*a* or the request accepted by the request acceptance processing part 21*b*, to transmit a command for controlling the lighting state of the vehicle interior light 7 to the illumination module 4.

Figure 3:
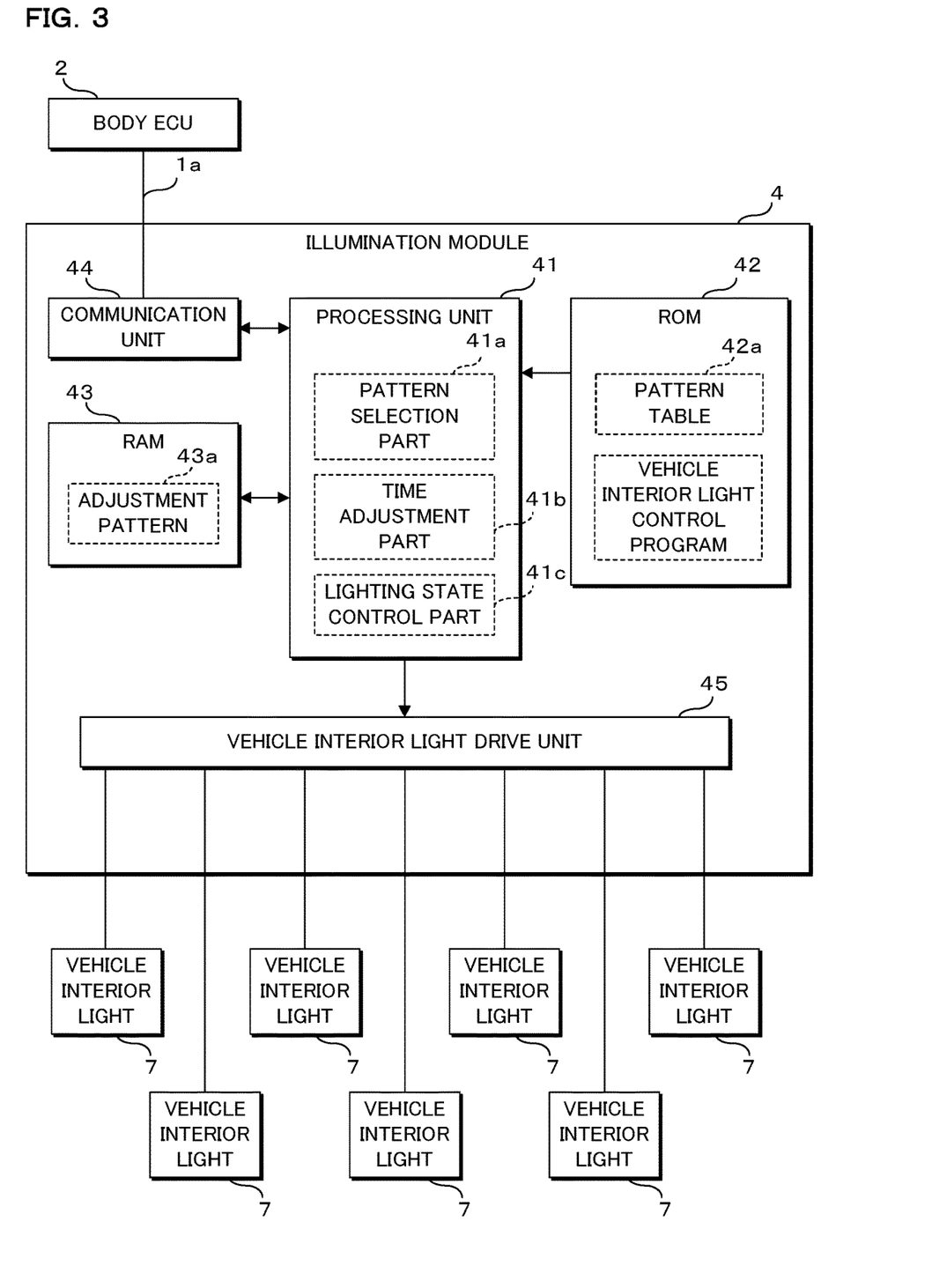
FIG. 3 is a block diagram illustrating the configuration of an illumination module according to the embodiment.

FIG. 3 is a block diagram illustrating the configuration of an illumination module 4 according to the present embodiment. The illumination module 4 is configured to comprise a processing unit (processor) 41, a read only memory (ROM) 42, a random access memory (RAM) 43, a communication unit (transceiver) 44, a vehicle interior light drive unit 45 and so forth. The processing unit 41 performs processing of controlling turning on or turning off of the vehicle interior light 7 in accordance with the command sent from the body ECU 2. The processing unit 41 may be configured as a dedicated integrated circuit (IC), for example, or may be configured to perform processing concerning control for turning on and off the vehicle interior light 7 by a general-purpose CPU, MPU or the like executing the vehicle interior light control program stored in the ROM 42, for example.

The ROM 42 is configured with a non-volatile memory element such as a mask ROM, an EEPROM or a flash memory, for example. The processing unit 41 is able to read out the program, data and the like stored in the ROM 42. In the present embodiment, the ROM 42 stores therein multiple change patterns in turning on and off the vehicle interior light 7 as a pattern table 42*a*.

Though FIG. 3 illustrates that the vehicle interior light control program is stored in the ROM 42, the vehicle interior light control program may not necessarily be stored in the ROM 42 if a dedicated IC is employed which is a hardware incorporating the processing therein, not a CPU or the like in which the processing unit 41 executes the program to perform processing. If the configuration where the processing unit 41 reads out and executes the vehicle interior light control program stored in the ROM 42 is employed, the vehicle interior light control program may directly be written into the ROM 42 before being mounted on a circuit board during the manufacturing process of the illumination module 4, for example, or may be written while utilizing a communication function of the illumination module 4. For example, the vehicle interior light control program may also be provided while being recorded in a recording medium such as a memory card or an optical disc, and may be read out from a recording medium by a device such as a memory card slot, an optical disc drive or the like installed in the illumination module 4 or the vehicle 1 and written into the ROM 42.

The RAM 43 is configured with a memory element such as a static random access memory (SRAM) or a dynamic random access memory (DRAM), for example. The processing unit 41 may read out and write data from/into the RAM 43. In the present embodiment, the RAM 43 stores therein an adjustment pattern 43*a* generated by the processing unit 41 based on the patterns stored in the pattern table 42*a* of the ROM 42.

The communication unit 44 is connected to the body ECU 2 via the communication line 1*a*, and transmits/receives information to/from the body ECU 2 via the communication line 1*a*. The communication unit 44 performs communication based on a communication protocol such as CXPI, CAN or LIN, for example. The communication unit 44 converts information for transmission sent from the processing unit 41 into an electric signal and outputs the signal to the communication line 1*a* to transmit the information, and sends reception information obtained by sampling the signal on the communication line 1*a* to the processing unit 41. In the present embodiment, it is not necessary that the illumination module 4 transmits information to the body ECU 2 as long as the illumination module 4 is able to receive information from the body ECU 2.

The vehicle interior light drive unit 45 supplies electric power from a power supply (battery or the like) of the vehicle 1 to multiple vehicle interior lights 7 (i.e., drives multiple vehicle interior lights 7), to individually turn on or off the vehicle interior lights 7. In the case where each of the vehicle interior lights 7 is configured to have multiple LEDs, the vehicle interior light drive unit 45 may be configured to individually control turning on or off for each LED. The vehicle interior light drive unit 45 may be configured to switch the vehicle interior light 7 between on and off by switching a relay, a semiconductor switch or the like arranged in a power supply path from a power supply to each vehicle interior light 7, for example, between an energized state and a disconnected state. Moreover, the vehicle interior light drive unit 45 drives each vehicle interior light 7 based on a signal sent from the processing unit 41. According to the present embodiment, the processing unit 41 outputs a signal for driving each vehicle interior light 7 as a pulse width modulation (PWM) signal. The vehicle interior light drive unit 45 switches a relay, a semiconductor switch or the like arranged in a power supply path from a power supply to each vehicle interior light 7 between the energized state and the disconnected state in accordance with the PWM signal sent from the processing unit 41. Accordingly, the processing unit 41 not merely turns on or off the vehicle interior light 7 but may also control the luminance of the vehicle interior light 7 by appropriately adjusting the duty ratio (hereinafter simply referred to as "duty") of the PWM signal to be output to the vehicle interior light drive unit 45.

Furthermore, the processing unit 41 in the illumination module 4 according to the present embodiment is provided with a pattern selection part 41a, a time adjustment part 41b and a lighting state control part 41c. The pattern selection unit 41a performs processing of selecting one pattern from multiple patterns stored in the pattern table 42a in the ROM 42 in accordance with the designation of a pattern contained in the command sent from the body ECU 2. The time adjustment part 41b generates an adjustment pattern 43a obtained by adjusting time for changing the lighting state of the vehicle interior light 7 based on the pattern selected by the pattern selection part 41a in accordance with information related to time for a state change contained in the command sent from the body ECU 2 and stores the adjustment pattern 43a in the RAM 43. The lighting state control part 41c performs processing of generating and outputting a PWM signal to be sent to the vehicle interior light drive unit 45 in accordance with the adjustment pattern 43a stored in the RAM 43.

<Time Adjustment Processing for Change in Lighting State>

Figure 4:
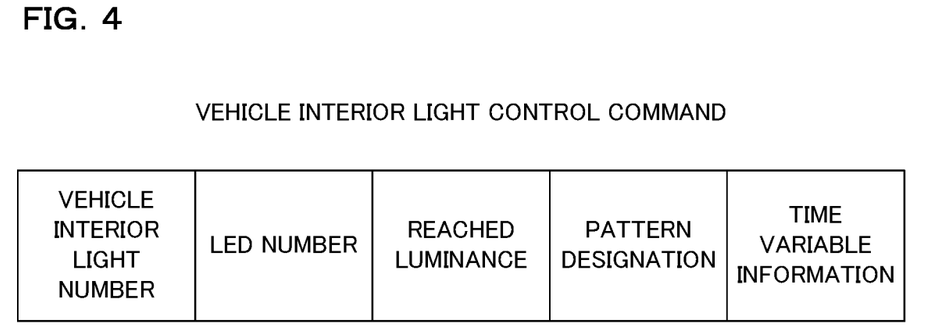
FIG. 4 is a schematic view illustrating an example of a vehicle interior light control command sent from the body ECU to the illumination module.

FIG. 4 is a schematic diagram illustrating an example of a vehicle interior light control command sent from the body ECU 2 to the illumination module 4. A vehicle interior light control command according to the present embodiment contains information such as a vehicle interior light number, an LED number, reached luminance, pattern designation and time variable information. The vehicle interior light number is information for designating the vehicle interior light 7 to be turned on or off, and an identification number that is uniquely attached to each vehicle interior light 7 is set therefor. The LED number is information for designating which LED is to be turned on or off in the case where a designated vehicle interior light 7 has multiple LEDs as a light source. The LED number may be designated as multiple numbers.

The reached luminance is the maximum luminance in the case where the vehicle interior light 7 is turned on, and is designated at a duty (0% to 100%) of the PWM signal to be output to the vehicle interior light drive unit 45 by the processing unit 41 of the illumination module 4. The pattern designation is information for designating a pattern stored in the pattern table 42a in the ROM 42 of the illumination module 4, and the designation is made by, for example, identification information attached for a pattern. Time variable information is information for designating, in the case where the lighting state of the vehicle interior light 7 is gradually changed, time required from start to end of the change. The time variable information may designate the rate of shortening or extending time in a predetermined range (e.g., 20% to 160%) with respect to a reference corresponding to the change in a pattern stored in the pattern table 42a.

Figure 5:
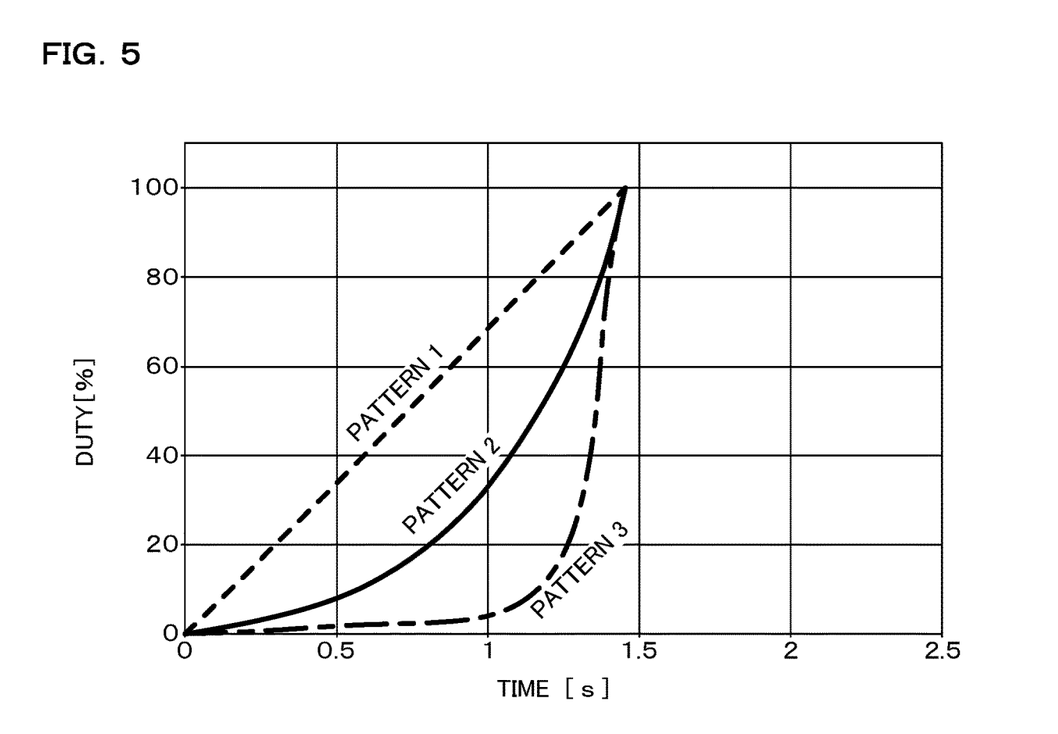
FIG. 5 is a schematic diagram illustrating an example of a pattern stored in a pattern table of the illumination module.

FIG. 5 is a schematic view illustrating an example of a pattern stored in a pattern table 42a for the illumination module 4. The illustrated example shows a graph illustrating the relationship between the duty [%] and the time [s] for the PWM signal to be output by the processing unit 41 in the case where the vehicle interior light 7 is changed from the off state to the on state (duty of 100%). In the graph, the horizontal axis represents time [s] whereas the vertical axis represents duty [%], while the duty [%] on the vertical axis may be regarded as the luminance of the vehicle interior light 7.

For example, a pattern 1 indicated by the broken line in FIG. 5 is a pattern where the luminance of the vehicle interior light 7 (duty of the PWM signal for driving the vehicle interior light 7) is linearly increased as time passes. Furthermore, a pattern 2 indicated by the solid line and a pattern 3 indicated by the dashed-dotted line in FIG. 5 are both patterns where the luminance of the vehicle interior light 7 is increased in a quadratic manner (or at an accelerated rate) as time passes, while the change rate is different from each other. The pattern table 42a containing such multiple patterns are written into the ROM 42 of the illumination module 4 during the manufacturing process or the like of the illumination module 4, for example. These multiple patterns are determined in advance in the design phase or the like of the vehicle 1 in accordance with the type of the light source constituting the vehicle interior light, for example.

Multiple patterns stored in the pattern table 42a are attached with identification numbers, for example, and such identification information is designated for pattern designation contained in the vehicle interior light control command sent from the body ECU 2 to the illumination module 4. The illumination module 4 reads out a pattern designated based on the pattern designation of the vehicle interior light control command from the pattern table 42a in the ROM 42 and changes the duty of the PWM signal as time passes in accordance with the read-out pattern, to change the lighting state of the vehicle interior light 7 so that the light fades in or out. In the case where the duty of less than 100% is designated as the reached luminance contained in the vehicle interior light control command, the illumination module 4 may change the duty in accordance with the read-out pattern, stop the change in the duty if it reaches the duty designated as the reached luminance, and maintain the output of the PWM signal at this duty.

In the case where a new vehicle interior light control command related to the vehicle interior light 7 is received from the ECU 2 while the illumination module 4 performs control to change the lighting state of the vehicle interior light 7, the illumination module 4 may abort the control of changing the lighting state which is being performed at that time point and start control in accordance with a newly-received vehicle interior light control command.

Figure 6:
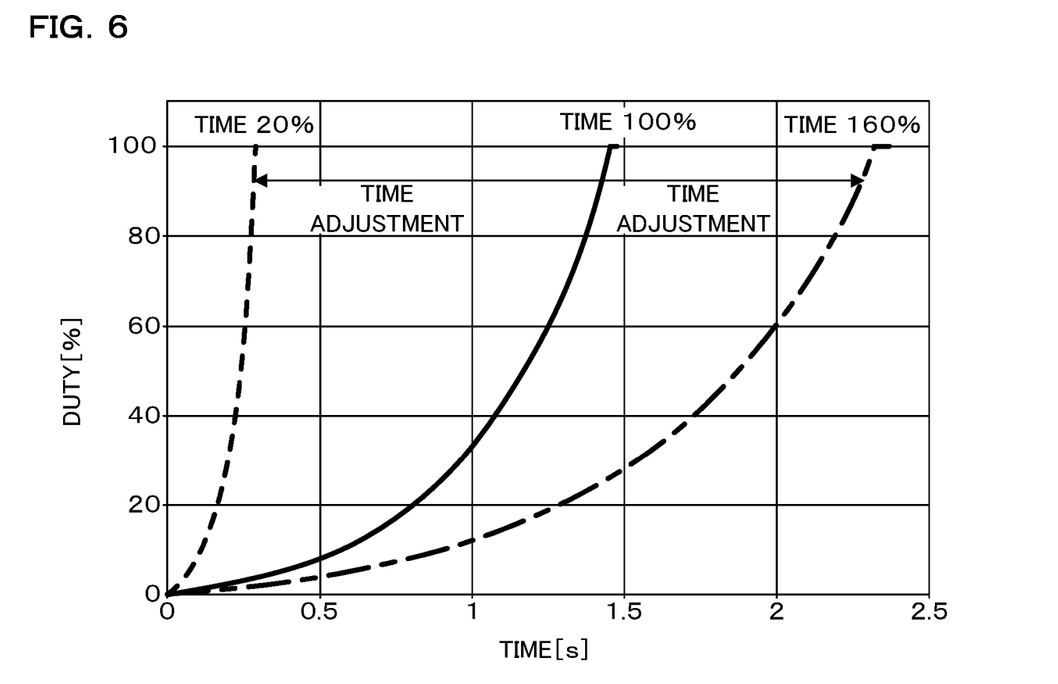
FIG. 6 is a schematic diagram illustrating time adjustment by the illumination module.
Figure 7:
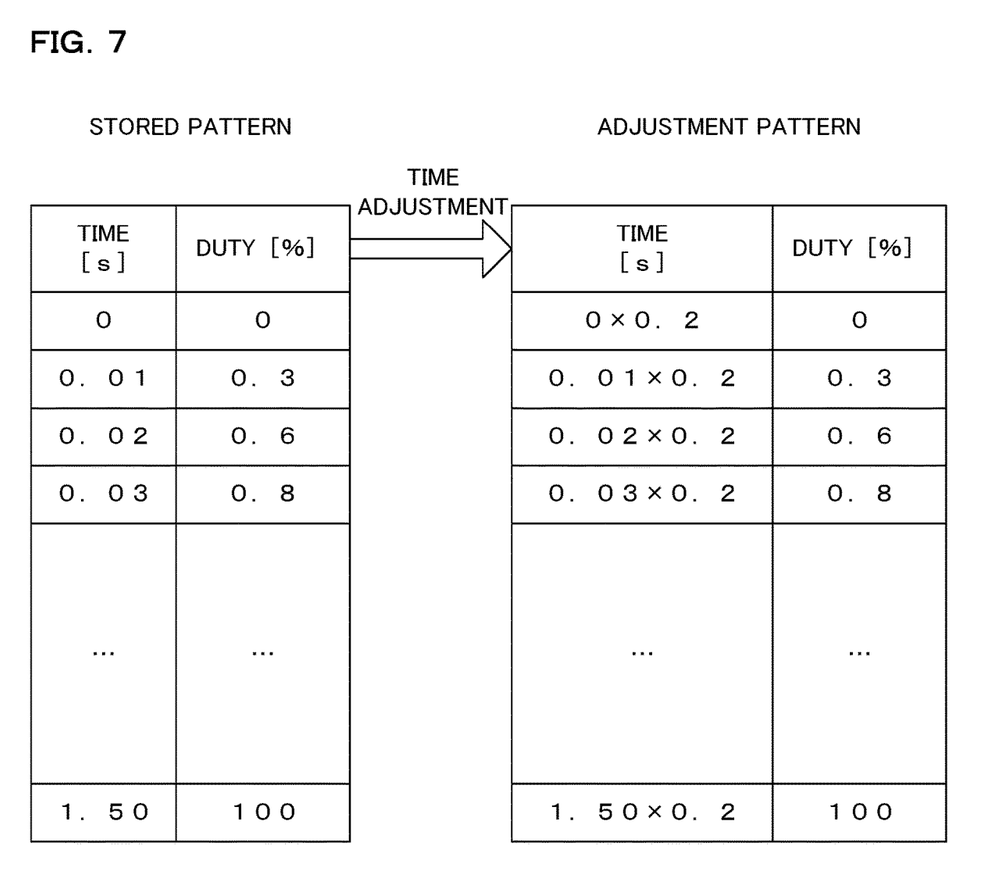
FIG. 7 is a schematic diagram illustrating time adjustment by the illumination module.

FIGS. 6 and 7 are schematic diagrams illustrating time adjustment by the illumination module 4. FIG. 6 illustrates an example of patterns in a graph where the horizontal axis represents time [s] and the vertical axis represents duty [%] as in FIG. 5. The pattern indicated by the solid line in FIG. 6 is the same as the one indicated as the pattern 2 in FIG. 5, which is a reference pattern stored in the pattern table 42a of the illumination module 4. The pattern indicated by the broken line in FIG. 6 is an adjustment pattern where the time until the duty reaches 100% is shortened to 20% of the reference pattern indicated by the solid line. Moreover, the pattern indicated by the dashed-dotted line in FIG. 6 is an adjustment pattern where the time until the duty reaches 100% is extended to 160% of the reference pattern indicated by the solid line.

Examples of numeric values for the pattern stored in the pattern table 42a (pattern indicated by the solid line in FIG. 6) are shown on the left side in FIG. 7, while examples of numeric values in an adjustment pattern (pattern indicated by the broken line in FIG. 6) are shown where the time is shortened to 20% of the pattern on the right side. As illustrated in FIG. 7, a pattern is stored in the pattern table 42a in the ROM 42 of the illumination module 4 as an aggregation of dots indicated by the combination of time and duty.

If the value of 100% is set for the time variable information contained in the vehicle interior light control command from the body ECU 2, the illumination module 4 may change the lighting state of the vehicle interior light 7 in accordance with the pattern read out from the pattern table 42*a*.

If a value other than 100% is set for the time variable information in the vehicle interior light control command, the illumination module 4 generates an adjustment pattern where the processing of time adjustment is performed for the pattern stored in the pattern table 42*a*. Here, the illumination module 4 may generate an adjustment pattern by multiplying each set of time and duty stored as a pattern by a rate which is set for the time variable information. The illumination module 4 stores the generated adjustment pattern in the RAM 43. In the RAM 43, the combinations of time and duty illustrated on the right side in FIG. 7 are stored as the adjustment pattern 43*a*. It is noted that the value of 100% is set for the time variable information, and the illumination module 4 may store the pattern read out from the pattern table 42*a* in the ROM 42 into the RAM 43 even in the case where generation of an adjustment pattern is not necessary. The illumination module 4 may count elapsed time using a timer or the like, and increase or decrease the duty of the PWM signal as time passes in accordance with the correspondence between the time and duty for a pattern stored in the RAM 43, to change the lighting state of the vehicle interior light 7 according to the pattern.

It is assumed in the present embodiment that the only operation accepted from the user by the operation unit 6 for a vehicle interior light is a switching operation for turning on or off the light. Here, in the case of accepting an operation of switching the light from the off state to the on state by the operation unit 6, the body ECU 2 transmits a vehicle interior light control command that sets a number for identifying the vehicle interior light 7 to be operated as well as a number for identifying an LED held by the vehicle interior light 7 as a vehicle interior light number and an LED number, sets the value of 100% as the reached luminance, designates a pattern defined for lighting the vehicle interior light as pattern designation, and designates the rate of time defined for the vehicle interior light as time variable information to the illumination module 4. Same values may be attained every time for the vehicle interior light number, LED number, reached luminance, pattern designation and time variable information of the vehicle interior light command that are transmitted upon switching of the vehicle interior light to the on state. Same applies to the switching from the on state to the off state.

Thus, after the body ECU 2 and the illumination module 4 are mounted to the vehicle 1, it is not necessary to change the values of the reached luminance, pattern designation and time variable information of the vehicle interior light control command, and same values may be set every time. As the vehicle interior light number, LED number, reached luminance, pattern designation and time variable information for controlling the vehicle interior light may be set for the illumination module 4, the illumination module 4 with the same configuration may be mounted to a different vehicle 1 having a different configuration of the vehicle interior light or a different specification required for the vehicle interior light, for example. This eliminates the need for developing an illumination module having a different configuration for a different vehicle type, for example, which can enhance the versatility of the illumination module 4.

It is however possible to employ a configuration where the values of reached luminance, pattern designation and time variable information are changed each time. For example, in the case where a dial switch or the like that can increase or decrease the brightness of the vehicle interior light is provided as the operation unit 6, the body ECU 2 may set a duty according to the brightness set by the dial switch as the reached luminance of the vehicle interior light control command. In the case where a dial switch or the like that can increase or decrease the time required for turning on or off the vehicle interior light is provided as the operation unit 6 for example, the body ECU 2 may set a rate according to the time set by the dial switch as the time variable information of the vehicle interior light control command.

Moreover, information similar to the vehicle interior light control command illustrated in FIG. 4 may be included in the request for turning on or off the vehicle interior light 7 sent from a different ECU 3 to the body ECU 2. Here, the body ECU 2 may generate a vehicle interior light control command in accordance with the values set for the request sent from the different ECU 3 and output the vehicle interior light control command to the illumination module 4. Furthermore, a configuration may also be employed where a request which only instructs to turn on or off the vehicle interior light 7 is sent from the different ECU 3 to the body ECU 2. Here, the body ECU 2 may set predetermined values for the reached luminance, pattern designation and time variable information of the vehicle interior light control command.

<Processing Procedure>

Figure 8:
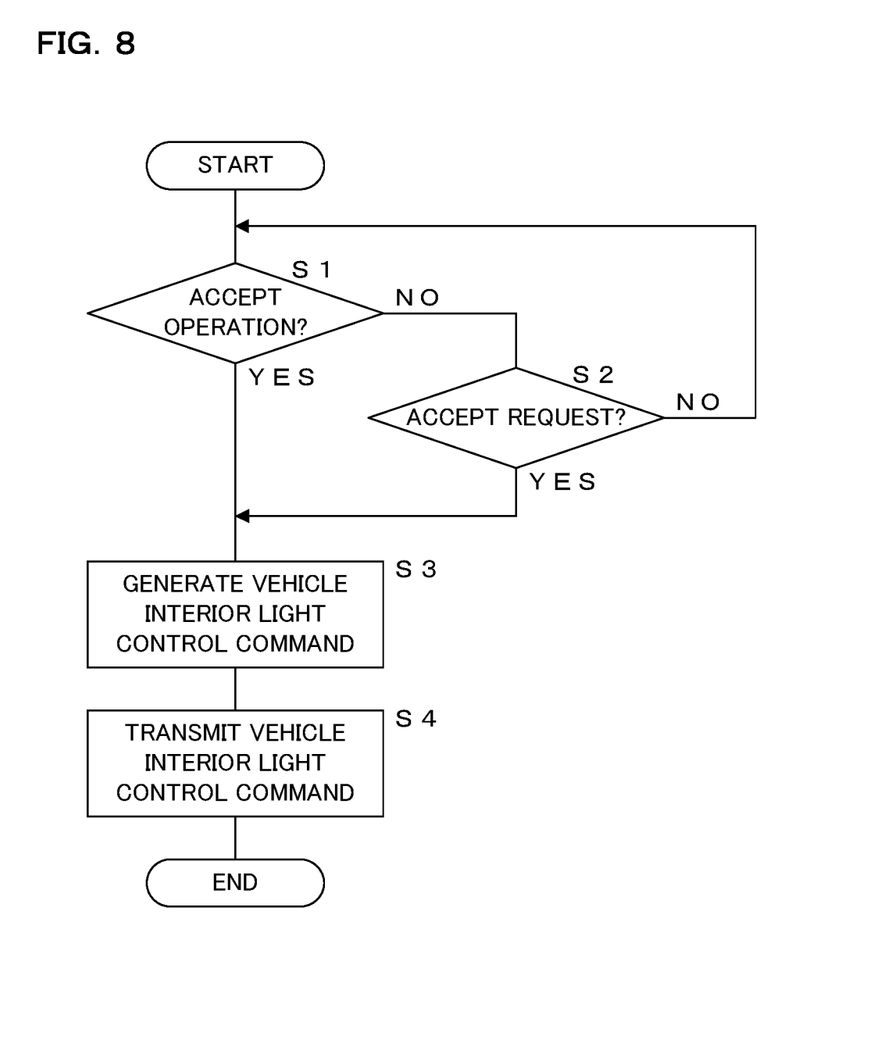
FIG. 8 is a flowchart illustrating a procedure of vehicle interior light control processing performed by the body ECU.

FIG. 8 is a flowchart illustrating a procedure of vehicle interior light control processing performed by the body ECU 2. The operation acceptance processing part 21*a* of the processing unit 21 in the body ECU 2 determines whether or not an operation concerning turning on or off of a vehicle interior light is accepted by the operation unit 6 (step S1). If no operation is accepted (S1: NO), the request acceptance processing part 21*b* of the processing unit 21 determines whether or not a request concerning turning on or off of the vehicle interior light is accepted by the second communication unit 25 from a different ECU 3 via the communication line 1*b* (step S2). If no request is accepted (S2: NO), the processing unit 21 returns the processing to step S1.

If an operation is accepted by the operation unit 6 (S1: YES) or a request from a different ECU 3 is accepted (S2: YES), the command transmission processing part 21*c* of the processing unit 21 generates a vehicle interior light control command where appropriate values are set for the vehicle interior light number, LED number, reached luminance, pattern designation, time variable information or the like so as to control the vehicle interior light in accordance with the operation details accepted by the operation acceptance processing part 21*a* or the request details accepted by the request acceptance processing part 21*b* (step S3). Subsequently, the command transmission processing part 21*c* sends the generated vehicle interior light control command to the first communication unit 24 to transmit the vehicle interior light control command to the illumination module 4 (step S4), and terminates the processing.

Figure 9:
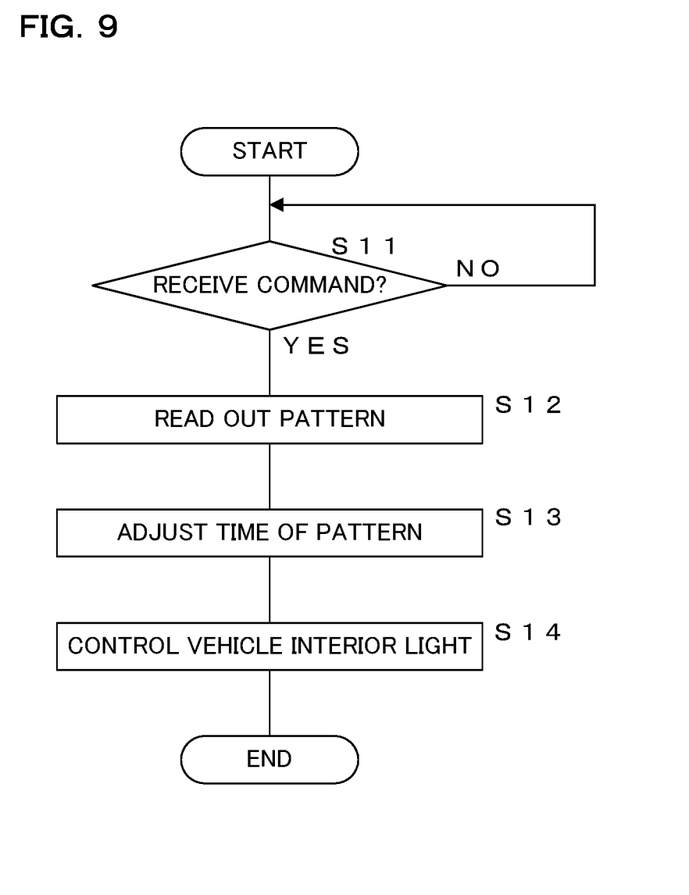
FIG. 9 is a flowchart illustrating a procedure of vehicle interior light control processing performed by the illumination module.

FIG. 9 is a flowchart illustrating a procedure of vehicle interior light control processing performed by the illumination module 4. The processing unit 41 of the illumination module 4 determines whether or not a vehicle interior light control command sent from the body ECU 2 is received by the communication unit 44 (step S11). If the vehicle interior light control command is not received (S11: NO), the processing unit 41 waits until the command is received. If the vehicle interior light control command is received (S11: YES), the processing unit 41 reads out a designated pattern from the multiple patterns stored in the pattern table 42*a* of the ROM 42 in accordance with the pattern designation contained in the received vehicle interior light control command (step S12). The time adjustment part 41b of the processing unit 41 adjusts the time of the pattern read out at step S12 in accordance with the rate set for the time variable information contained in the received vehicle interior light control command (step S13) and generates an adjustment pattern. The lighting state control part 41c of the processing unit 41 outputs a PWM signal to the vehicle interior light drive unit 45 which drives the LED of the vehicle interior light 7 designated by a vehicle interior light number and an LED number in accordance with an adjustment pattern generated at step S13, performs control for the vehicle interior light (step S14) and terminates the processing. In the procedure of the present flowchart, the illumination module 4 that received the vehicle interior light control command from the body ECU 2 generates an adjustment pattern every time it receives a command, though not limited thereto, and the illumination module 4 may also perform control for the vehicle interior light 7 while utilizing an adjustment pattern stored in the RAM 43 without generating an adjustment pattern if the adjustment pattern is already stored in the RAM 43.

<Conclusion>

The vehicle interior light control system according to the present embodiment having the configuration described above gradually changes the vehicle interior light 7 of the vehicle 1 from the first state to the second state. For example, such control is performed that the duty is increased so as to gradually increase the luminance of the vehicle interior light 7 from the off state (duty of 0%) to the on state (duty of 100%) or that the duty is decreased so as to gradually decrease the luminance of the vehicle interior light 7 from the on state to the off state. Furthermore, the vehicle interior light control system adjusts the time required for changing the state of the vehicle interior light from the first state to the second state. Accordingly, time adjustment may be performed by the vehicle interior light control system even in the case where the time required for changing the lighting state for each vehicle type varies, for example, and thus the vehicle interior light control system of the same sort may be mounted to multiple types of vehicles, which can enhance the versatility of the vehicle interior light control system.

Moreover, in the vehicle interior light control system according to the present embodiment, a pattern for changing the vehicle interior light from the first state to the second state is stored in the pattern table 42a of the ROM 42, and the lighting state of the vehicle interior light is changed in accordance with the stored pattern. This can implement lighting control suitable for the type of a light source that constitutes the vehicle interior light, for example. In the vehicle interior light control system, an adjustment pattern where the time required for changing the state is generated relative to the pattern stored in the pattern table 42a, and the state of the vehicle interior light 7 is changed in accordance with the generated adjustment pattern. The vehicle interior light control system stores multiple patterns in the pattern table 42a, selects any one of the stored patterns, adjusts time for the selected pattern and generates an adjustment pattern to change the state of the vehicle interior light 7. Storing more than one patterns allows the vehicle interior light control system to have higher versatility.

The vehicle interior light control system according to the present embodiment comprises the illumination module 4 for driving the vehicle interior light 7 and the body ECU 2 for sending a command to the illumination module 4 through communication. In the case where operation of turning on or turning off the vehicle interior light is accepted by the operation unit 6, or where a request for turning on or off the vehicle interior light is received from a different ECU 3, the body ECU 2 transmits a vehicle interior light control command concerning turning on or off of the vehicle interior light 7 to the illumination module 4. Here, the body ECU 2 transmits to the illumination module 4 a vehicle interior light control command including time variable information that designates the time required for changing the state of the vehicle interior light 7 as well as pattern designation related to a change in the state of the vehicle interior light 7. Such a configuration may provide a highly versatile illumination module 4.

While the present embodiment described a configuration where the LED is used as a vehicle interior light 7, it is not limited thereto but a light source other than the LED, for example, a light source such as incandescent light or fluorescent light may also be employed as the vehicle interior light 7. Moreover, the illumination module 4 is employed as the device for driving the vehicle interior light, it is not limited thereto. The vehicle interior light driving device may also be a device of any name other than the illumination module 4. While the body ECU 2 is employed as the control device that transmits a vehicle interior light control command to the illumination module 4, it is not limited thereto, but a configuration where various in-vehicle control devices other than the body ECU 2 transmit a vehicle interior light control command to the illumination module 4 may also be employed. Furthermore, the patterns illustrated in FIGS. 5 to 7 are mere examples and are not limited thereto. While the time adjustment is performed in the range of 20% to 160% with respect to the reference pattern, the range is a mere example and a narrower range or a wider range may also be employed for the time adjustment. Furthermore, the vehicle interior light control system is not limited to the configuration described in the present embodiment, and configurations described in Variation Examples may also be employed, for example.

Variation Example 1

While the illumination module 4 according to the embodiment described above is configured to set a pattern stored in the pattern table 42a of the ROM 42 as a reference pattern and to generate an adjustment pattern by multiplying the time for the reference pattern by a rate designated in the time variable information of the vehicle interior light control command, the configuration is not limited thereto. The illumination module 4 according to Variation Example 1 also stores an adjustment pattern relative to the reference pattern in the pattern table 42a of the ROM 42, and reads out the adjustment pattern according to a vehicle interior light control command sent from the body ECU 2 from the pattern table 42a to control the vehicle interior light 7. The configuration of the illumination module 4 according to Variation Example 1 is suitable for the case where the storage capacity of the ROM 42 is sufficiently secured. The adjustment pattern is stored in advance, which eliminates the need for generating the adjustment pattern and thus allows the processing unit 41 to reduce the burden of processing.

Variation Example 2

The vehicle interior light control system according to the embodiment described above is configured to perform control of the vehicle interior light 7 by two devices of the body ECU 2 and the illumination module 4 cooperating with each other, though the configuration is not limited thereto. The vehicle interior light control system according to Variation Example 2 has a configuration where the body ECU 2 and the illumination module 4 are integrated together to work as one device. In the case where the operation unit 6 accepts operation of turning on or off, for example, the integrated vehicle interior light control device selects and reads out a pattern from the pattern table 42a pre-stored in a non-volatile storage unit, generates an adjustment pattern where time is adjusted for the read-out pattern, and outputs a PWM signal of the duty according to the generated adjustment pattern to perform control of the vehicle interior light 7.

Variation Example 3

A vehicle interior light control system according to Variation Example 3 adjusts time of turning on and off in accordance with the state of the vehicle 1 even for the same vehicle interior light. For example, the vehicle interior light control system according to Variation Example 3 turns on a room lamp in the case where the user unlocks and opens a door for the first time in the state where the vehicle 1 is parked. Here, in the vehicle interior light control system according to Variation Example 3, a relatively long time is taken to gradually increase the luminance of the room lamp for turning on the light, thereby providing the user who enters the vehicle 1 with a welcoming atmosphere. In the case where the user opens a door at a timing other than that described above, the vehicle interior light control system according to Variation Example 3 increases the luminance of the room lamp in a relatively short time to turn on the light.

In order to perform lighting control of such a room lamp, the body ECU 2 according Variation Example 3 obtains, for example, the on/off state of an ignition (IG) switch of the vehicle 1, the lock state of a door of the vehicle 1, and the open/close state of a door of the vehicle 1. In the case where the IG switch is in the off state and a door of the vehicle 1 is changed from the closed state to the open state after the lock of the door is changed from the locked state to the unlocked state, the body ECU 2 transmits a vehicle interior light control command in which the value of 160% is set as time variable information, for example, to the illumination module 4. Accordingly, the illumination module 4 generates an adjustment pattern where the state is changed in the time corresponding to 160% of the reference pattern stored in the pattern table 42a of the ROM 42, and a long time is taken to turn on a room lamp in accordance with the adjustment pattern.

In the case where a door is changed from the closed state to the open state under a condition other than the ones described above, the body ECU 2 transmits a vehicle interior light control command in which the value of 100% is set as time variable information, for example, to the illumination module 4. Accordingly, the illumination module 4 turns on a room lamp in a shorter time compared to the case under the conditions described above, in accordance with the reference pattern stored in the pattern table 42a of the ROM 42. In such a case, the body ECU 2 may set the value of 20% as time variable information, for example, and may turn on the room lamp in a shorter period of time. This allows the user to clearly feel the difference in time for turning on the room lamp.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

What is claimed is:

1. A vehicle interior light control system that controls a state concerning lighting of a vehicle interior light mounted to a vehicle, comprising:
   a lighting state control part that gradually changes the vehicle interior light from a first state to a second state different from the first state;
   a time adjustment part that adjusts time required for a state change from the first state to the second state made by the lighting state control part; and
   a pattern storage unit storing a pattern of change in the vehicle interior light from the first state to the second state, the pattern of change comprising information concerning time required for the state change to a brightness of the vehicle interior light, the time adjustment part generating an adjustment pattern by adjusting time required for the state change for the pattern of change stored in the pattern storage unit,
   wherein the lighting state control part changes the state of the vehicle interior light in accordance with the adjustment pattern generated by the time adjustment part, and
   wherein the generated adjustment pattern is stored, and, when the adjustment pattern is already stored, the time adjustment part does not generate the adjustment pattern and the system performs control using a stored adjustment pattern.

2. The vehicle interior light control system according to claim 1, wherein
   the pattern storage unit stores a plurality of patterns,
   the vehicle interior light control system further comprises a pattern selection part that selects any one of the plurality of patterns, and
   the time adjustment part makes an adjustment for a pattern selected by the pattern selection part.

3. The vehicle interior light control system according to claim 2, further comprising:
   a vehicle interior light driving device that includes the lighting state control part, the time adjustment part, the pattern storage unit and the pattern selection part, and that drives the vehicle interior light in accordance with control performed by the lighting state control part; and
   an in-vehicle control device that is connected to the vehicle interior light driving device via a communication line, and that transmits a command concerning a state change of the vehicle interior light including designation of time required for the state change and designation of the pattern to the vehicle interior light driving device via the communication line.

4. The vehicle interior light control system according to claim 3, wherein
   the in-vehicle control device transmits the command including designation of time required for the state change, designation of the pattern and designation of the second state to the vehicle interior light driving device.

5. A vehicle interior light driving device, comprising:
   a lighting state control part that gradually changes a vehicle interior light mounted to a vehicle from a first state to a second state different from the first state;
   a time adjustment part that adjusts time required for a state change from the first state to the second state made by the lighting state control part; and a pattern storage unit storing a pattern of change in the vehicle interior light from the first state to the second state, the pattern of change comprising information concerning time required for the state change to a brightness of the vehicle interior light, the time adjustment part generating an adjustment pattern by adjusting time required for the state change for the pattern of change stored in the pattern storage unit, wherein the vehicle interior light is driven in accordance with control of the lighting state control part, and wherein the lighting state control part changes the state of the vehicle interior light in accordance with the adjustment pattern generated by the time adjustment part, and wherein the generated adjustment pattern is stored, and, when the adjustment pattern is already stored, the time adjustment part does not generate the adjustment pattern and the device performs control using a stored adjustment pattern.

6. A vehicle interior light control method of controlling a state concerning lighting of a vehicle interior light mounted to a vehicle, comprising:

transmitting, by an in-vehicle control device mounted to the vehicle, a command concerning designation of time required for a state change of the vehicle interior light from a first state to a second state different from the first state to a vehicle interior light driving device that drives the vehicle interior light;

adjusting, by the vehicle interior light driving device, time required for a state change from the first state to the second state while gradually changing the vehicle interior light from the first state to the second state in accordance with a command from the in-vehicle control device;

storing a pattern of change in the vehicle interior light from the first state to the second state, the pattern being a pattern for changing the state of the vehicle interior light with respect to an elapsed time, the pattern of change comprising information concerning time required for the state change to a brightness of the vehicle interior light;

generating an adjustment pattern by adjusting time required for the state change for the stored pattern of change;

changing the state of the vehicle interior light in accordance with the generated adjustment pattern, wherein the generated adjustment pattern is stored, and, when the adjustment pattern is already stored, the program does not cause the vehicle interior light driving device to generate the adjustment pattern, and causes the vehicle interior light driving device to perform control using a stored adjustment pattern.

7. A non-transitory recording medium in which a vehicle interior light control program is recorded, the vehicle interior light control program causing a vehicle interior light driving device that controls a state concerning lighting of a vehicle interior light mounted to a vehicle to adjust time required for a state change in a case where the vehicle interior light is gradually changed from a first state to a second state different from the first state, perform processing of changing the vehicle interior light from the first state to the second state in accordance with adjusted time, store a pattern of change in the vehicle interior light from the first state to the second state, the pattern being a pattern for changing the state of the vehicle interior light with respect to an elapsed time, the pattern of change comprising information concerning time required for the state change to a brightness of the vehicle interior light, generate an adjustment pattern by adjusting time required for the state change for the stored pattern of change, and change the state of the vehicle interior light in accordance with the generated adjustment pattern, wherein the generated adjustment pattern is stored, and, when the adjustment pattern is already stored, the program does not cause the vehicle interior light driving device to generate the adjustment pattern, and causes the vehicle interior light driving device to perform control using a stored adjustment pattern.

* * * * *